United States Patent [19]
Lacoste

[11] 3,864,990
[45] Feb. 11, 1975

[54] GEAR TORQUE TRANSMISSION BOXES

[75] Inventor: Gerard H. Lacoste, St-Maur des Fosses, France

[73] Assignee: Herwaythorn S.A., Paris, France

[22] Filed: May 15, 1973

[21] Appl. No.: 360,480

[30] Foreign Application Priority Data
May 25, 1972 France .............................. 72.18621

[52] U.S. Cl. ................ 74/606 R, 74/665 D, 74/745
[51] Int. Cl. ............................................ F16h 57/02
[58] Field of Search ............ 74/325, 331, 333, 360, 74/606 R, 745, 665 D, 665 S, 625

[56] References Cited
UNITED STATES PATENTS
3,290,962 12/1966 McCann et al. ............. 74/606 R X
FOREIGN PATENTS OR APPLICATIONS
427,438 4/1926 Germany ......................... 74/665 D

*Primary Examiner*—Samuel Scott
*Assistant Examiner*—Frank H. McKenzie, Jr.
*Attorney, Agent, or Firm*—Waters, Roditi, Schwartz & Nissen

[57] ABSTRACT

A set of parts for making up different gear torque transmission boxes comprises a principal part A comprising a casing with two shafts supporting gear wheels, the casing having openings at the shaft ends and an upper opening, a secondary part B comprising a casing with an upper and lower opening and two side openings surrounding the ends of a shaft carrying a gear wheel, a part C forming a shaft exit with a dog for fitting to the shaft openings of the parts A and B, a simple shaft exit part D comprising a jacket with a coupling plate for fitting to the shaft openings of parts A and B, a similar shaft exit part F with take off for a tachometer, and covers for openings in parts A and B which are not connected to other parts.

8 Claims, 16 Drawing Figures

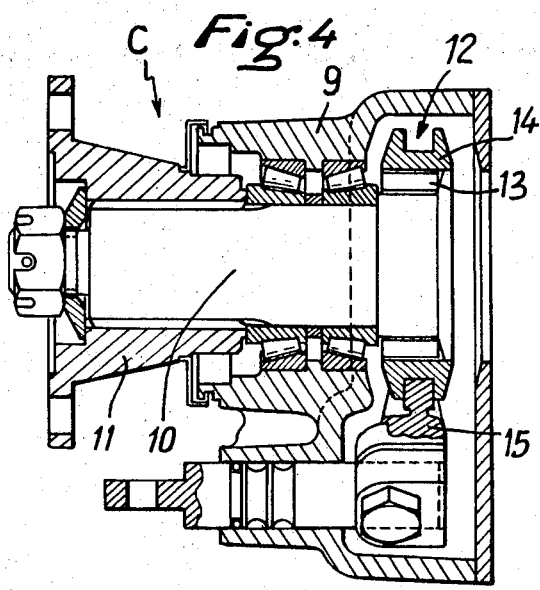
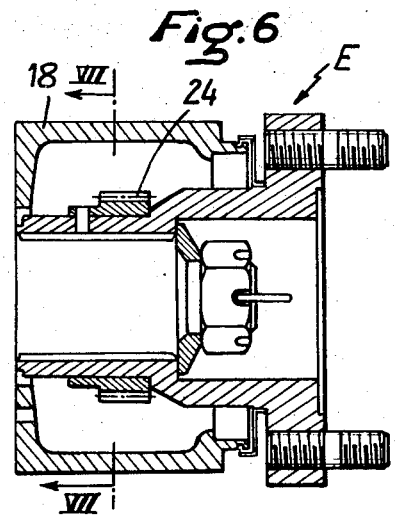
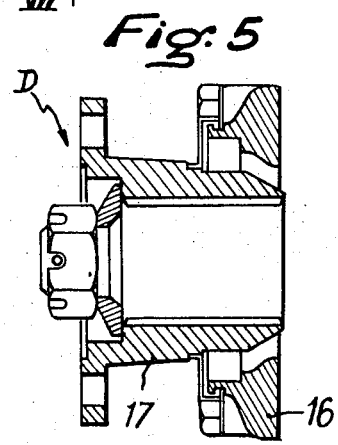
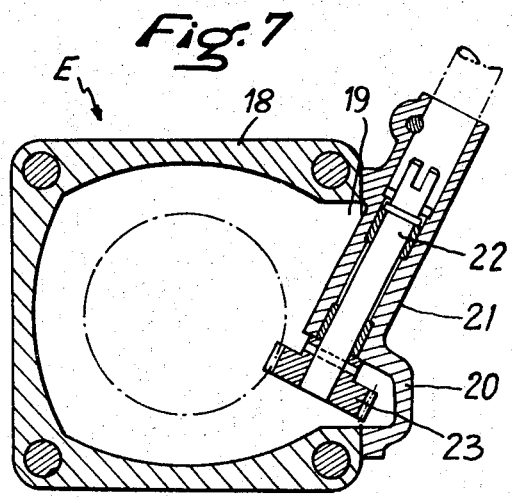
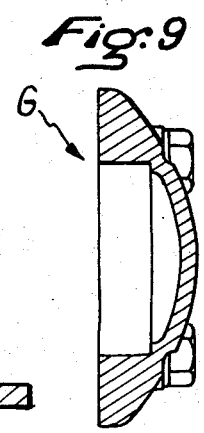
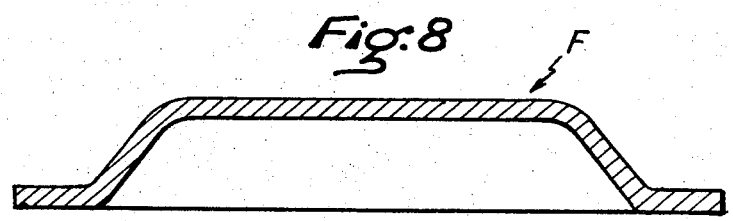

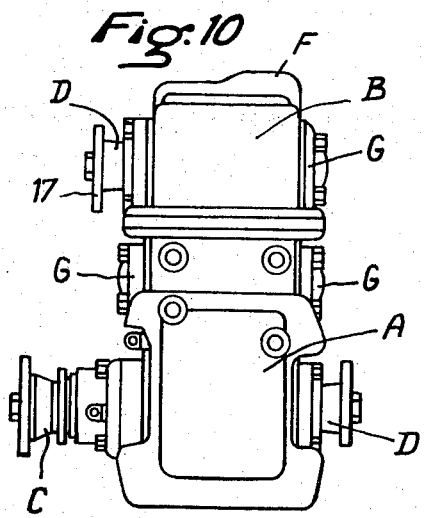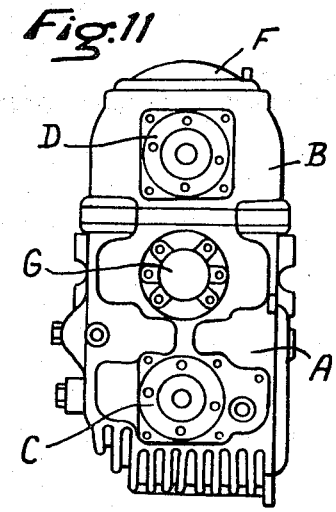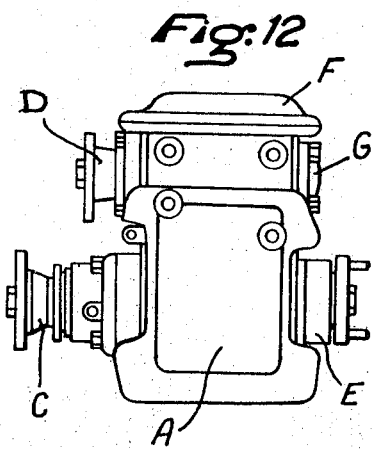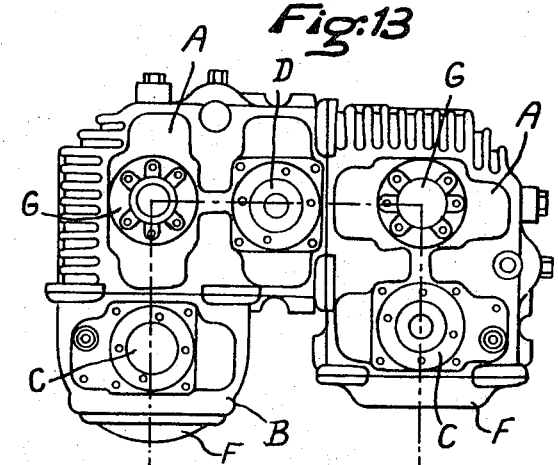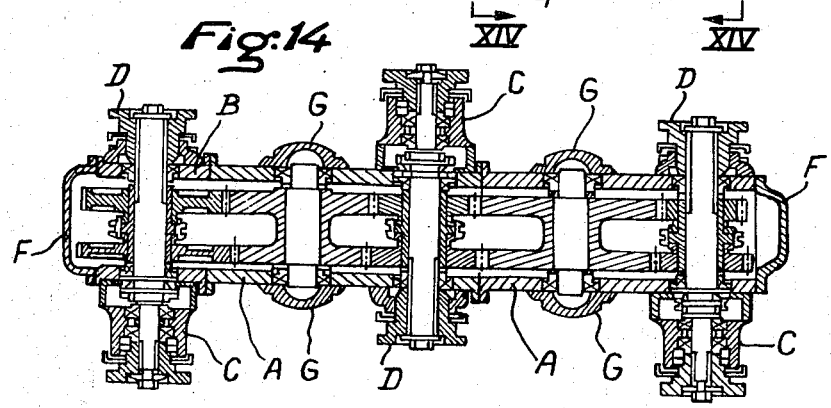

GEAR TORQUE TRANSMISSION BOXES

BACKGROUND OF THE INVENTION

The invention relates to a set of mechanical parts to make up, as required, different gear torque transmission boxes. The invention concerns mainly, but not exclusively, transfer boxes mounted on vehicles and motor appliances.

Up till now the different torque transmission boxes, inclusive of vehicle transfer boxes, have been designed and manufactured specially to meet the needs of each particular application.

SUMMARY OF THE INVENTION

The principle object of the invention is to provide a set of parts with which it is possible to make up transfer boxes appropriate to the requirements for use on a large number of different vehicles.

Another object of the invention is to supply a set of parts which makes it possible to build up not only transfer boxes but simple or complex, or even very complex transmission boxes.

A supplementary object of the invention is to provide a set of parts with which it is possible to build up gear torque transmission boxes and to arrange different entrances and exits, it being possible to fit the shaft ends at the entrances and at the exits as required with coupling plates with or without dogs, with or without take off points for a tachometer or speedometer, or with the possibility of being protected by covers.

BRIEF DESCRIPTION OF THE DRAWINGS

FIG. 4 is a sectional view taken along line IV—IV of FIG. 3, FIG. 5 is a view, in elevation and in section, of a part according to the invention, called part D, a simple shaft exit, FIG. 6 is a view, in elevation and in section, of a part according to the invention, called part E, a shaft exit with take-off point for a tachometer, FIG. 7 is a sectional view taken along line VII—VII of FIG. 6, FIG. 8 is an elevation view of a part according to the invention called part F, a casing cover, FIG. 9 is a view, in elevation and in section, of a part according to the invention called part G, a shaft end cover, FIGS. 10 and 11 are views from the side and the end, respectively, of a transmission and disconnection box built up from parts according to the invention, FIG. 12 is an elevation view of a transfer box with two gear trains, made up from parts according to the invention, FIGS. 13 and 14 are views in elevation and in section, taken along line XIV-XIV, of FIG. 13 respectively, of a torque transmission box with five gear trains, built up from parts according to the invention.

DESCRIPTION OF THE PREFERRED EMBODIMENTS

Figure 1:
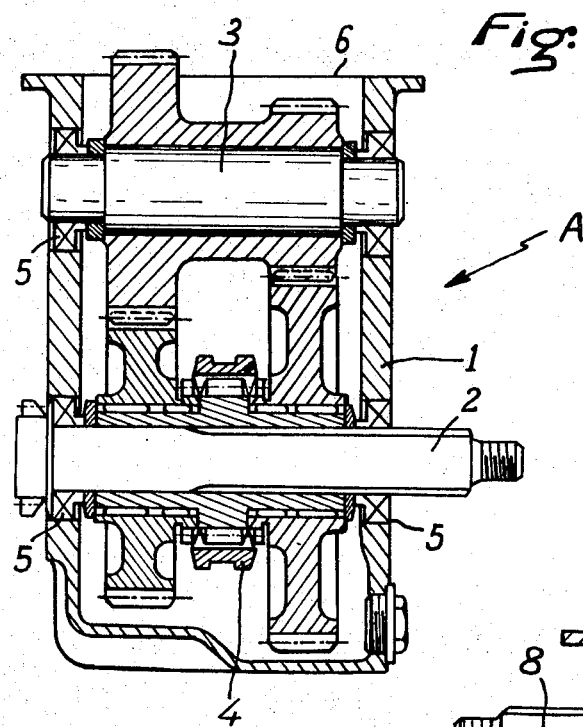
FIG. 1 is a view, in elevation and in section, of a part according to the invention called the principal part A.

The set of parts according to the invention comprises a principal part A (FIG. 1) which in turn comprises a casing 1 containing two shafts 2, 3 supporting two gear wheels which mesh with one another. In its middle portion the lower shaft 2 is provided with a dog device 4 which can be manipulated from the outside and which enables one or other of the gear wheels located on each side of this dog device to be brought into action. The upper shaft 3 is in one single piece.

The shafts 2, 3 are supported by roller bearings accommodated in openings provided in the side walls of the casing of the part A. The four side openings 5 are identical; they surround the shaft ends which are accessible through these openings.

At its upper end the casing 1 has an opening surrounded by a coupling flange. The casing is closed at its lower end to hold oil. One of the side faces of the casing 1 also has an opening 6 with a coupling flange identical with the upper opening. This side opening 6 may be formed and machined at the same time as the other parts of the casing. It may also be provided initially and obturated by a thin covering of material which can easily be removed if necessary by a simple and quick machining operation. In this case it may be said that this opening is roughed out.

The side openings 5 being identical, it will be noticed that the shafts 2 and 3 are interchangeable.

Figure 2:
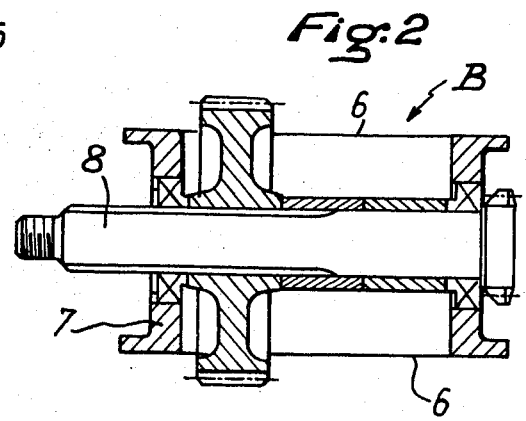
FIG. 2 is a view, in elevation and in section, of a part according to the invention called the secondary part B.

The set of parts according to the invention also contains a secondary part B (FIG. 2). This is made up of a casing 7 open at its upper and lower ends and containing a shaft 8 which carries a pinion. The shaft 8 is supported by roller bearings. These are accommodated in openings 5 which are identical with the openings 5 of the part A.

The upper and lower openings are identical with the opening 6 of the part A and have been given the same reference 6.

Figure 3:
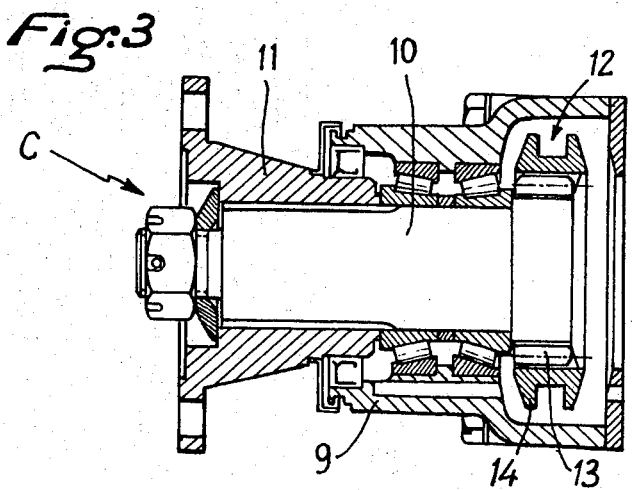
FIG. 3 is a view, in elevation and in section of a part according to the invention called part C, a shaft exit with dogs.

In accordance with the invention the set further includes a part C which is a shaft exit with dogs (FIGS. 3 and 4). It has a bearing 9 with an opening suitable for fixing to the casings 1 and 7 of the parts A and B corresponding to any one of the six openings 5. This bearing 9 contains two roller bearings which guide a shaft section 10. The latter has one end projecting out of the bearing and provided with a coupling plate 11 which is rotationally fixed to it. At its second, inner end the shaft section 10 is fitted with a dog device made up of a toothed pinion 13 fixed to the end of the section 10 and an internally toothed ring 14. The latter can be manipulated from the exterior by a fork 15.

Another of the parts according to the invention is the part D in FIG. 5 which is known as a simple shaft exit. It comprises a jacket 16 which has a first and a second opening, these openings being opposite one another. One of them is such as to correspond with the openings 5 of the parts A and B and it enables the jacket to be fixed to the casings 1 and 7 of the parts A and B so as to correspond with any one of the six openings 5. A coupling plate 17 projects at the other end of the jacket 16, in the interior of which it is extended by a reamed and broached extension in such a way that it can be fixed on the end portion of a shaft. A tight joint is disposed between the jacket 16 and the extension of the plate.

FIGS. 6 and 7 show a part E which is known as a shaft exit with a take-off for a tachometer. It is similar to the part D, as can be seen from the drawings, but the jacket 18 is more elongated and it has a side opening 19 closed by a supporting bearing 21 containing a shaft 22 which has a pinion 23 on its inner end. This pinion meshes with a gear wheel 24 rotationally fixed on the extension or elongated internal portion of the the coupling plate. As is known, the shaft 22 may be connected by a flexible cable to some suitable instrument, such as, for example, a speedometer or revolution counter.

Another part of the set according to the invention can be seen in FIG. 8. This is the part F or casing cover which is of such a depth and which has an opening with a flange such that it is adapted to cover any one of the three openings 5 of the parts A and B.

FIG. 9 shows another part according to the invention, the part G which is designed so that it can obturate any one of the six side openings when these are not fitted with another part C, D or E.

By means of the parts which have just been described it is possible to build up, as required, different transfer boxes for trucks or different motor appliances; furthermore it is also possible to construct economically a quantity of torque transmission boxes which have various entrances and exits and which are capable of meeting many needs.

It will be readily understood that only a few examples can be given from the numerous combinations which are possible and practical using the parts described above.

FIGS. 10 and 11 show an example of a torque transmission box with the possibility of disconnection.

This box is made up from a part A on the upper opening of which is mounted a part B the upper opening of which is obturated by a part F. This gives a box with three gear trains providing six shaft ends which can be equipped as required. One end of the shaft of the part B is fitted with a part D of which the plate 17 constitutes the entrance to the transmission box.

The ends of the lower shaft of the part A are provided respectively with a part D and a part C with dogs.

The side openings of the shaft ends which are not in use are obturated by parts G.

FIG. 12 shows to a two-gear train transfer box. This is obtained by assembling a principal part A and a part F which obturates its upper opening.

One end of the upper shaft is provided with a part D of which the plate acts as entrance to the transfer box while its opposite end is obturated by a part G.

The lower shaft has a dog C at one end and a take-off for a tachometer at the other, on the part E.

It will be noted that the invention also makes it possible to obtain a disconnection box on a torque transmission line. A part B is used then, the upper and lower openings of which are each obturated by a part F. A part D or E is mounted at one of the shaft ends and a part C at the opposite end.

FIGS. 13 and 14 give an example of a more complex transmission box. This comprises two principle parts A which are assembled by coupling the upper opening of one to the identical side opening of the other while the upper opening of this latter part is obturated by a part F.

Furthermore, a part B is mounted by its lower opening on the side opening of the first part A, while the upper opening of this part B is obturated by a part F.

Five gear trains become available and the ends of the shafts can be fitted as required, by means of parts D on certain ends and parts C on the opposite ends. The openings of the casings corresponding to the shaft ends not in use are closed by means of parts G.

An important advantage of the invention is that the box can be modified. The parts C and D can be transposed or it is even possible to obtain an additional power take-off by replacing a cover G by a part C.

Instead of coupling two parts A side by side, it is possible to superimpose them and join them by their upper opening, their shafts being fitted, for example, with two parts C and one part E. Then the unused side openings are obturated by four parts G.

Figure 15:
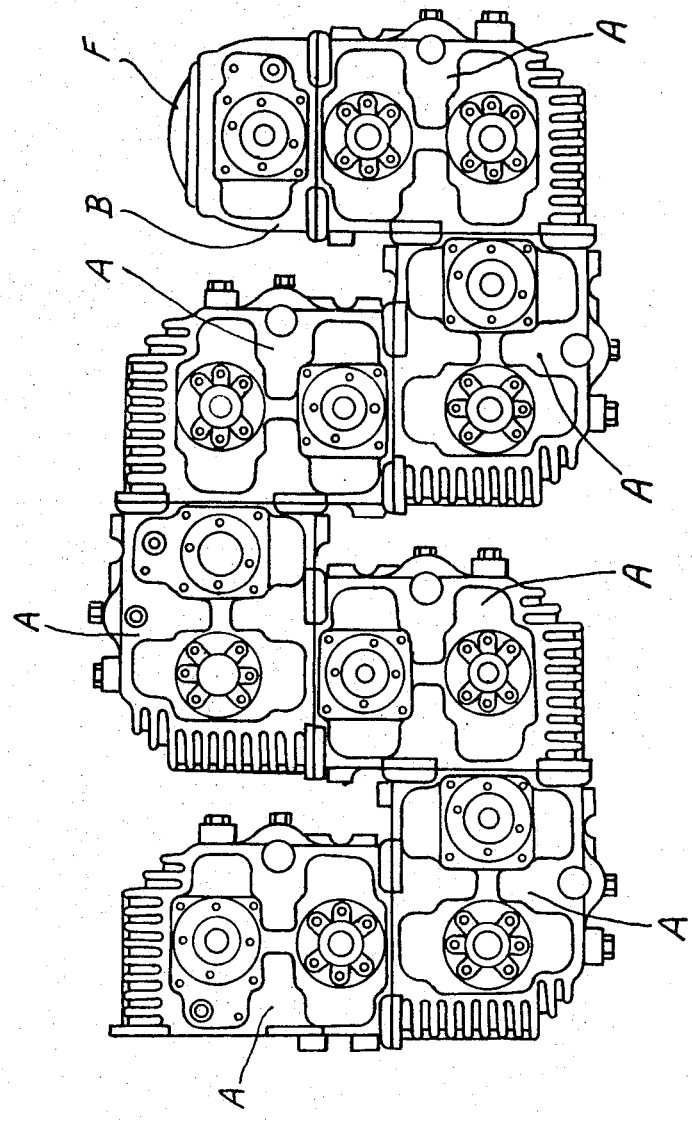
FIG. 15 is an elevation view of a torque transmission box with fifteen gear trains, built up from parts according to the invention.

It has already been explained that the invention gave the possibility of a disconnection box with a single shaft, using a part B. FIG. 15 shows that the invention also provides for a transmission box with a very high number of gear trains.

Assembling seven parts A by their lateral and upper faces and one part B closed by a cover F gives fifteen gear trains. The 30 shaft ends can be protected by covers G or may be fitted optionally, as required, with a part C, D or E.

Figure 16:
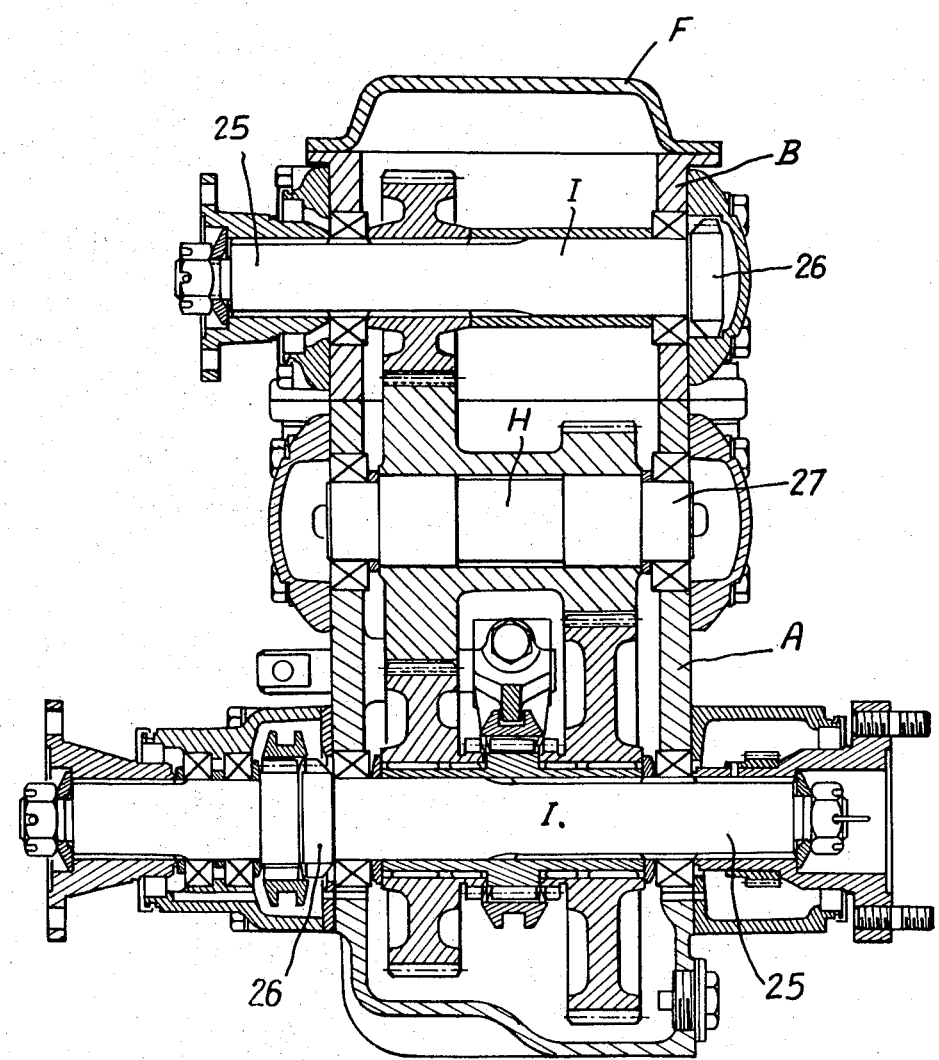
FIG. 16 is a view, in elevation and in section, of a transfer box with three gear trains, for trucks, built up from parts according to the invention.

There was described earlier, with reference to FIG. 12, a transfer box with two gear trains. FIG. 16 shows a transfer box with three gear trains. It comprises a principal part A provided on its upper opening with a secondary part B which is itself closed on its upper portion by a part F.

The three shafts in this assembly carry gear wheels and pinions which mesh with one another. The invention does not impose the diameters of the gears and pinions; these may be fixed as required within the limit allowed by the distance between axles. It should be noted that it is admissible to disposed a spacing plate between the part A and the part B to adjust to the desired value the distance which separates the two upper shafts.

Use of one or other of the parts C, D, E entails the use of a shaft of which the end 25 is designed for the chosen part. For the parts D and E the shaft must have a projecting end with broach slots or keyways for fixing the driving plate. For the element C the shaft must terminate in an external pinion 26 which is designed to be coupled to the pinion 13 of this part C by means of the ring 14.

A shaft which must not receive any part at the end, C, D, E, terminates at 27 right at the point of its emergence from the roller bearing supporting it. However, in conformity with the invention, since the side openings of the casings are identical one shaft may easily be replaced by another if required. In fact, as shown in FIG. 16, over and above the parts which have been described, the set according to the invention is advantageously completed by shafts of two types only, a shaft H which has no ends projecting from the casing and a shaft I which has two projecting ends, one being a grooved extension 25 and the other a pinion 26.

It should be noted that the pinion 26, when it is not associated with a shaft exit part C, may be protected by a part G acting as a shaft end cover.

All the torque transmission, or disconnection, or transfer boxes which can be made up by means of the set of parts according to the invention, in particular all those described and illustrated, are obtained with shafts H and I which may easily be transposed when entrances or exits are required to be differently sited.

I claim:
1. A set of parts for making up different gear torque transmission boxes, which set of parts comprises:
   a principal part A comprising a casing containing two shafts supporting gear wheels and having an upper opening, with four identical side openings surrounding the four shaft ends,
   a secondary part B comprising a casing containing a shaft supporting at least one gear wheel and having an upper opening and a lower opening which are identical with one another and identical with the upper opening of the principal part A, means at said upper and lower openings for attachment of part B to part A at said upper opening, also two side openings surrounding the two shaft ends, these side openings being identical with one another and identical with the four openings of the principal part A,
   a part C constituting a shaft exit with dog, comprising a bearing, a section of shaft supported by the bearing having a first end projecting from the bearing and a coupling plate fixed on this end, a second internal end supporting a dog device, a means of operating the dog device which is accessible from the outside the bearing, said bearing having an opening and means allowing it to be fixed to any one of the six openings surrounding the shaft ends of the principal part A and the secondary part B,
   a part D constituting a simple shaft exit, composed of a jacket having a first opening and a second opening opposite to it, a coupling plate projecting from an opening in the jacket and extending to the interior of the latter, means at the other opening in the jacket enabling it to be fixed to any one of the six openings surrounding the ends of the shafts of the principal part A and of the secondary part B,
   a part E constituting a shaft exit with take-off for tachometer, similar to part D, and including an extended internal portion provided with a gear wheel and a further extended jacket having a side opening which is closed by a supporting bearing containing a shaft fitted at its inner end with a pinion meshing with the gear wheel,
   a part F constituting a casing cover with means for fixing it to any one of the upper and lower openings of the parts A and B, and
   a part G constituting a shaft end cover with means for fixing it to any one of the six side openings of the parts A and B.
2. A set of parts according to claim 1, in which part A includes a side opening which is at least roughed out and identical with the upper opening.
3. A set of parts according to claim 2, wherein said shafts of part A are of two types, including shafts of type H without any ends projecting from the casing, and shafts with one end projecting and having keyways, and another end projecting and provided with a toothed pinion.
4. A set of assembled parts constituting a transfer box for a motor vehicle, which is made up of parts according to claim 3, which are brought together and comprise:
   a part A fitted at its opposite lower side ends with a part C, a shaft exit with dog, and a part E, a shaft exit with take-off for tachometer, the upper side ends of this part being obturated by parts G, shaft end covers,
   a part B fixed to part A, its lower opening coinciding with the upper opening of part A and its side openings being fitted respectively with a part D, a simple shaft exit, kand a part G, a shaft end cover,
   three type H and I shafts appropriate to the other parts used, and
   a part F, casing cover, obturating the upper opening of the part B.
5. A set of assembled parts constituting a torque transmission box made up of parts according to claim 3 brought together and comprising:
   two parts A each having a side opening and an upper opening which are identical, fitted together with the upper opening of one coinciding with the side opening of the other,
   a part B fitted to one of the parts A with one of its upper and lower openings coinciding with the side opening of this part,
   two parts F, one of which obturates an upper opening of one part A and the other the opening of part B which is not yet obturated, and
   a number of parts C, D, E mounted on the shaft end side openings of the parts A and B, with shafts of type H and I to correspond.
6. A set of assembled parts constituting a transfer box with two gear trains, which is made up of parts according to claim 3 brought together and comprising:
   a part A which has its upper opening obturated by a part F,
   two type I shafts, one being provided with a part D in the upper portion of the casing and the other, in the lower portion of the casing, being fitted with a part C at one end and with a part E at the other end.
7. A set of assembled parts constituting a torque disconnection box made up of parts according to claim 3 brought together and comprising:
   a part B,
   two parts F, casing covers, obturating the upper and lower openings of this part B,
   a part C, a shaft exit with dog, fitted to one of the side openings of the part B,
   one of the parts D and E, fitted to the second of the side openings of the part B, and
   a type I shaft.
8. A set of assembled parts constituting a countermotion box with power take-off, made up of parts according to claim 3 brought together and comprising:
   two parts A superimposed one on the other, brought together and fixed one to the other in opposite directions by their upper openings,
   two parts C, shaft exit with dog, mounted respectively one on one of the side openings of a part A and the other on one of the side openings, on the opposite side, of the second part A,
   a part E, a shaft exit with take-off for tachometer, mounted on the side opening opposite that of the part C of the second part A,
   four shafts of types H and I appropriate to the shaft exit parts, and
   four parts G, shaft end covers, mounted respectively on the four unused side openings of the two parts A.

* * * * *